SUPERCONDUCTING MATERIAL

Filed Jan. 28, 1966

INVENTOR.
ROBERT H HAMMOND

BY Anderson, Luedeka, Fitch, Even, & Tabin
ATTORNEYS

United States Patent Office 3,449,092
Patented June 10, 1969

3,449,092

SUPERCONDUCTING MATERIAL

Robert H. Hammond, San Diego, Calif., assignor, by mesne assignments, to Gulf General Atomic Incorporated, San Diego, Calif., a corporation of Delaware Filed Jan. 28, 1966, Ser. No. 535,284
Int. Cl. C23c 13/02
U.S. Cl. 29—194 12 Claims

ABSTRACT OF THE DISCLOSURE

An improved superconductive material is provided which comprises a plurality of layers of one material which has superconductive electrical properties at a low absolute temperature. Disposed intermediate each pair of layers of the one material is a layer of a second material which has nonsuperconductive electrical properties at the low absolute temperature, thus providing a composite material of alternate layer construction. Each layer of second material is substantially thinner than the layers of the first, superconductive material. An improved method for making such a material is also provided which comprises alternately depositing a thin layer of the first superconductive material and intermittently halting such deposition and depositing a layer of the second nonsuperconductive material.

This invention relates generally to superconductors and, more particularly, to an improved superconductive material.

The phenomenon of superconductivity wherein the electrical resistivity of certain materials becomes immeasurably small at temperatures near absolute zero has been known for many years. Early investigators of superconductivity envisioned the construction of large powerful electromagnets capable of producing strong magnetic fields utilizing superconductive materials. It was discovered, however, that the existence of superconductivity also depended upon the magnetic field at the surface of the material so that if the current in the coil of a magnet produced a sufficiently strong magnetic field at its surface the material would become normally conductive, causing the field to collapse. For many materials investigated in early research the critical magnetic field, above which the material became merely normally conductive, was found to be of the order of less than 1 kilogauss.

In recent years research in the field of superconductors has involved another class of materials, which have been designated as "Type II" superconductors, as contrasted with the above described "Type I" superconductors. In Type II superconductors, superconductivity persists in the presence of much higher magnetic fields than is true for Type I superconductors. Use of such materials has made possible the fabrication of electromagnets wound with superconducting wire which can produce relatively powerful magnetic fields ranging as high as 100 kilogauss. Such magnets, however, have been most useful in solid state physics experimental applications which require a simple field configuration in a modest volume. The development of large volume superconducting magnets having complex field configurations, such as are desired for nuclear fusion research, high energy physics and commercial alternating current devices, for example, transformers, generators and transmission lines, has been hampered by a variety of factors.

There are primarily two problem areas relating to the effective use of known superconductive materials; these may be referred to as "flux migration" and "current degradation." "Flux migration" is that phenomenon which causes the flux lines to move when a high transport current is introduced perpendicular to the flux field. "Current degradation" is that phenomenon which results in the inability of superconductive wires when wound into magnets to carry current equivalent to or in excess of those currents which are carried before such winding into magnets. Since the field strength of an electromagnet is dependent upon the current which the wires carry, the necessity of developing superconductive materials capable of carrying large currents in order to produce large and powerful superconductive magnets, becomes apparent. Known methods of increasing current carrying capacity, such as introducing defects as by imperfect sintering, present difficulties in that the process is often expensive, and the product characteristics are non-uniform and, further, the product is insufficiently flexible to facilitate the forming of coils.

In general, therefore, in electromagnet design, it is desired to attain the largest possible current density in the coils within the limits imposed by material properties. In conventional magnets, i.e., those formed with nonsuperconducting wires, the current density is limited by the requirement for cooling the magnet. With superconductors the upper limit on the current density is a property of the material which depends upon the magnetic field and which is termed the "critical current density." When the current density in the material exceeds the critical value, the material reverts to its normally conductive state. Accordingly, a need has arisen for improved superconductive materials having large critical current densities particularly at high magnetic field strengths. Such materials may be useful not only in fabricating magnets but in a variety of applications, for example, transmission lines or transformers.

It is, therefore, an important object of the invention to provide a superconductive material same which has good current carrying capabilities at relatively high magnet fields.

Another object of the invention is to provide a superconductive material which has a high critical current density at high magnetic field strengths.

Still another object of the invention is to provide a superconductive material having improved flexibility so that it may more easily be fabricated into a superconductive coil.

Yet another object of the invention is to provide a superconductive material which may be fabricated relatively simply and without great expense.

Other objects and advantages of the invention will become apparent from the following description when considered in conjunction with the accompanying drawings, in which.

Figures 1, 2, 3:
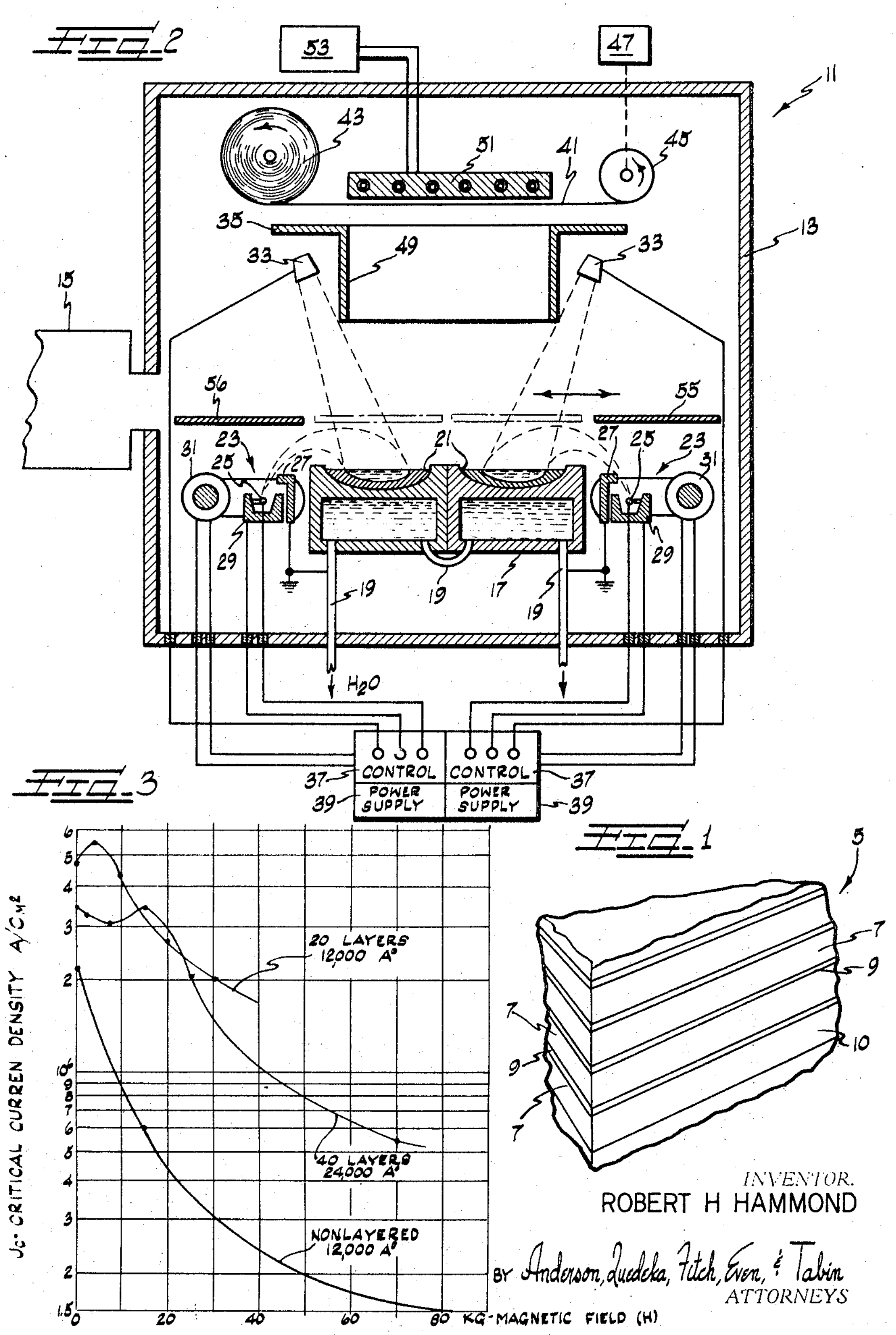
FIGURE 1 is an enlarged fragmentary perspective view of a sample of the improved superconductive material.
FIGURE 2 is a schematic illustration of apparatus with which the method of making the improved superconductive material may be practiced.
FIGURE 3 is a graph illustrating the electrical properties of the material shown in FIGURE 1.

In general, the improved superconductive material 5, as illustrated in FIGURE 1, includes a plurality of discrete thin layers 7, usually less than about a micron thick, of a superconductive material and a plurality of discrete thin layers 9 of a second material being a nonsuperconductor, that is, it may be a material of normal conductive or insulative properties disposed intermediate the layers 7 of superconductive material so as to provide a composite material of alternating layers.

More particularly, the layers 7 are preferably formed of a Type II superconductor such as $Nb_3Sn$, which has temperatures of transition to the superconductive state which are in excess of 17° K. The thin layers 9 may be formed of any suitable material which is a normal conductor, such as silver, niobium, copper, etc., or an insulator such as composites of silicon or aluminum, or suitable organic compounds. The primary requisite of the material which makes up the thin layers 9 is that the expansion and contraction characteristics are compatible with that of the superconductive material. A material may be generally defined as having good normal electrical conductivity if it has a resistivity of the order of $10^{-6}$ ohm-meters or less, measured at 0° C. The critical current density through samples of the composite layered material 5 has been found to be higher over a wide range of magnetic fields than a comparable non-layered sample made only of a super-conductive material, such as $Nb_3Sn$.

It would seem upon superficial examination that disposing layers of material which are nonsuperconductive within a superconductive material could only result in a lower overall average current density because the resistivity of the nonsuperconductive layers are so much greater than that of the superconductive layers. However, the unexpected contrary result has been found to be the case.

The reasons for this phenomenon are not completely understood and the following tentative explanation is not intended to limit the scope of the claims appended hereto. Under present theory, it is believed that the maximum current that can be carried, or the critical current density of a Type II superconductor in a magnetic field, is decreased by the migration of magnetic flux lines through the superconductive material. This motion of the flux lines is hindered by defects or discontinuities in the structure of the superconductive material, or in other words the flux lines may be said to be "pinned down" by the discontinuities, thus increasing the critical current density. The layers 9 of nonsuperconductive material provide such discontinuities and the flux lines are pinned at the layers of the nonsuperconductive material. Consequently the layers of superconductive material 7 are freed of moving flux lines and can carry higher currents.

The layers 7 of superconductive material should be of sufficient thickness to perform their current-carrying function and no thicker than a value sufficient to suitably so perform under normal conditions. In general, further increase in thickness increases the volume of the composite material 5 without further significantly improving its properties. Generally, the thickness of the superconductive layer will be no more than about one micron and not less than about 50 A. Preferably, thicknesses no greater than about 2000 A. and no smaller than about 75 A. are employed for $Nb_3Sn$ layers. Within this range, desirable properties both economically and electronically result.

In general, in preparing the improved superconductive material 5, the thickness of the nonsuperconductive layers 9 need only be sufficient to perform the function of providing an integral barrier to pin down the flux lines. In this respect, the thickness may vary somewhat with properties of the specific material used, but usually the nonsuperconductive layer will be at least about 10 A. thick. When niobium is employed, it is preferred that layer of about 100 A. is used. When $Nb_3Sn$ and $N_b$ are used for the superconductive and nonsuperconductive layers respectively, a thickness for the latter layer between about 15 A. and 400 A. is preferred. Although the thicker layers 9 are not believed to be necessary, the nonsuperconductive layers 9 may be employed up to about a thickness equal to about 20% of the thickness of the superconductive layers 7, if desired.

The total number of alternating layers 7 and 9 which are employed to make the improved superconductive material 5 depends upon the intended end use of the material 5. The improvement in superconductive properties is evident in examination of a pair of layers 7 of superconductive materials with a layer 9 of nonsuperconductive material sandwiched therebetween. However, for practical purposes, it is expected that at least about 100 layers 7 of superconductive materials will usually be employed, including alternate layers 9 of nonsuperconductive material. Although there is not believed to be any critical maximum number of superconductive layers 7 which may be employed, for practical purposes more than about 10,000 layers 7 will probably not be used, or a total thickness of the composite superconductive material 5 of more than about 0.06 cm. will probably not be employed for most applications.

Fabrication of the improved superconductive material 5, may be accomplished by using such means as vacuum deposition, flame spraying, sputtering, chemical deposition or any other suitable process which allows the creation of alternate layers of superconductive and nonsuperconductive materials.

A preferred method of preparing the improved superconductive material 5 involves a selective vacuum deposition technique in an electron beam furnace described in detail below. Utilizing such a technique, the superconductive material 5 is formed on a substrate 10 of any suitable material, preferably stainless steel, and may be covered, if desired, by a protective layer of a conductive material, such as tin, copper or silver which may also conveniently be applied by vacuum deposition. The protective layer may be composed solely of a good electrical and thermal conductor or it may be desirable to add an additional thin coating of a material that is a good insulator. It is presently believed that the use of a protective layer contributes toward reducing the current degradation phenomenon. The protective layer acts as a protective current shunt when the superconductive material suddenly takes on normally conductive characteristics thereby allowing the superconductive material to attain thermodynamic stability and to once again become superconductive. Another function of the protective layer is to furnish mechanical protection to the superconductive material 5. Usually, a protective layer at least on the order of about the same thickness of the superconductive material is employed when such a protective layer is used.

The superconductive material 5 may be stripped from the substrate 10 for use in appropriate applications, in which instance the substrate 10 would be coated with a suitable releasing agent. However, in certain instances, such as fabricating magnets, the improved superconductive material 5 may desirably be formed on a permanent substrate 10, so as to produce a wire suitable for winding into a solenoid or toroid. The retention of substrate 10 is optional depending upon the particular use of the improved superconductive material, however, it would appear retention of the substrate 10 would result in added strength of the final product thereby yielding a greater scope of utilization.

An advantage of the improved material made by deposition in an electron beam furnace is that the layers are flexible so as to be readily fabricated into coils for magnets.

The process for producing the improved superconductive material is illustrated in FIGURE 2 of the drawings wherein is schematically shown an electron beam furnace 11 which is suitable for the production of the improved superconductive material 5. The electron beam furnace 11 includes an outer enclosure 13 which is adapted to permit evacuation to very low pressures via a large conduit 15 which leads to a suitable vacuum pump (not shown). A hearth 17, which is supported within the enclosure 13, is provided with a suitable cooling system 19 and is formed to include at least two separate crucibles 21. Within one crucible, the left hand crucible (as viewed in FIG. 2), there is disposed a quantity of vacuum-melted niobium having 30 parts or less per million of impurities. In the other crucible 21, there is disposed a quantity of vacuum-melted tin having ten parts or less per million of impurities. The enclosure 13 is evacuated to a pressure of about $10^{-5}$ torr.

An electron gun 23 is provided in association with each of the crucibles 21 to provide sufficient electron bombardment to heat the substance in each crucible to the desired temperature for evaporation. The electron guns 23 are of common construction each comprising a filament 25, an accelerating anode 27 and focusing cathode 29. A U-shaped magnet 31 straddles each electron gun 23 and directs the stream of electrons which are given off onto the surface of the substances in the associated crucibles 21. Electron guns of this general type are disclosed in U.S. Patent No. 3,132,198. The rate of evaporation from each crucible 21 is controlled by monitoring means 33 mounted vertically above the crucibles. A baffle 35 restricts the field of each monitor 33 to the crucible 21 with which it is associated by effectively blocking the line of sight between the monitor and the surface of the unassociated crucible 21.

A control system 37 is provided for each of the electron guns together with a power supply 39. A circuit between the associated monitor 33 and the power supply 39 utilizes feedback from the monitor 33 to proportionally increase or decrease the power being supplied to the associated electron guns 23 in order to obtain evaporation of the substance in the associated crucible at precisely the desired rate.

A plurality of flat substrate strips 41 are disposed in parallel arrangement about 25 centimeters vertically above the surface level of the two crucibles 21. Long rolls of stainless steel ribbon about two one-thousandths of an inch thick are employed. The substrate strips 41 run between a feed roll 43 and a takeup roll 45. Movement of the substrate strips is intermittent and is regulated by a control device 47 which operates a motor (not shown) drivingly connected to the takeup roll 45. In the illustrated furnace, the deposition of the discrete parallel layers which make up the improved superconductive material 5 is carried out as a batch-type process in which the area upon which deposition is carried out at a given time is determined by an opening 49 provided in the baffle 35.

A substrate heater 51 is provided and is adjusted to maintain the portion of the substrate strips 41 where deposition occurs at a temperature of about 750° C. A suitable thermostatic control 53 permits this temperature regulation.

It is within the skill of the art to construct apparatus of this general type wherein the deposition can be carried out continuously by utilizing additional apparatus of this type and by routing the substrate strips 41 so that they make a plurality of passes alternately past one baffle opening where $Nb_3Sn$ is deposited and then past another where niobium is deposited.

To simply accomplish the deposition of niobium alone or tin alone rather than the simultaneous deposition of niobium and tin to form $Nb_3Sn$, shutters 55 and 56 are provided which are separately movable back and forth, or pivotable, between respective first positions (shown in solid lines) where they do not interfere with the upward path of the evaporating atoms of tin and niobium and second positions (shown in dotted outline) where they block the evaporating atoms of tin or niobium from reaching the substrate 41. Accordingly, it can be seen that intermittent movement of the shutter 55 to the blocking position results in the deposition of alternating layers of niobium and $Nb_3Sn$ on the substrate strips and movement of the shutter 56 to the blocking position results in the deposition of a layer of tin.

When production is ready to be begun, the controls 37 are adjusted so that evaporation rate of niobium is approximately twice that of the tin. This two to one ratio of niobium to tin accomplishes the deposition of $Nb_3Sn$. As soon as the desired rates of evaporation are achieved, the control device 47 is actuated to advance the takeup roll 45 sufficiently to place a fresh area of substrate strips 41 vertically above the baffle opening 49. As soon as a layer 7 of $Nb_3Sn$ of the desired thickness, say about 500 A. thick, is deposited, the shutter 55 is moved into the blocking position for a time sufficient to allow a layer of niobium about 100 A. thick to be deposited covering the $Nb_3Sn$ layer. The shutter 55 is then immediately withdrawn so that an alternate layer of $Nb_3Sn$ may be deposited covering the layer of niobium. When the thickness of the $Nb_3Sn$ layer reaches a thickness of 500 A. the supply of tin is blocked once again allowing the niobium alone to be deposited. It should be noted that there is no difference as to the effectiveness of the improved superconductive material when the first layer to be applied to the substrate is the nonsuperconductive material as opposed to the superconductive material as illustrated above.

This process is repeated a sufficient number of times to provide a composite superconductive material 5 having the desired number of total layers. In a particular example, the composite material is 20 layers thick, composed of parallel alternate layers of 500 A. thick $Nb_3Sn$ and 100 A. thick niobium, having a total thickness of about 12,000 A. This composite superconductive material having a total of 20 layers is deposited in about two minues. As soon as the last or twentieth layer is deposited, the shutter 56 is moved into the blocking position, and a protective layer of tin is deposited for about 10 minutes. Then the power is cut off from the electron guns, and the control device 47 is actuated to roll the substrate strips 41 (and composite layered material 5 which has been deposited upon it) onto the takeup roll. The layers of niobium-tin and niobium which are deposited in this manner are flexible enough so that they may be rolled without cracking or suffering any other undesirable physical defects.

In the illustrated furnace 11, four parallel strips of the composite layered superconductive material 5 are produced which are each two inches long and 0.1 inch wide. Testing of a sample of this material may be carried out by the resistance method. A piece of the superconductive material 5 which may be of the approximate dimensions 0.1 inch by 1.0 inch is connected in parallel with a voltmeter having known resistance and the sample and voltmeter in parallel are connected in series to a source of electromotive force which may be varied in a known manner. The sample is cooled below the transition temperature of niobium-tin so as to become superconductive and subjected to a measured magnetic field parallel to the planes of the layers. The current through the sample is slowly increased until the sample reverts to the normally conductive state. This is usually a catastrophic event and takes place as soon as a detectable voltage appears across the sample. The current at time of the transition which may be calculated using Ohm's law is the critical current of the sample at the particular field strength and from this measurement and the sample dimensions the critical current density is obtained.

A plurality of such measurements at various magnetic fields result in a sufficient number of points to allow the plotting of a critical current density curve for a particular sample so tested. FIGURE 3 depicts three such critical current density curves for three different materials, two of which are composed of the improved superconductive material, the difference being their thickness, one sample containing 20 alternate layers and the other 40 alternate layers, and the third material being composed solely of $Nb_3Sn$. The sample made solely of $Nb_3Sn$ has the same dimensions as described above with a thickness of about 12,000 A. The curves are all based on results obtained by an identical procedure varying only the sample to be tested. The critical current density at all field strengths is higher with both samples of the improved superconductive material than with the comparative sample made solely of $Nb_3Sn$. The samples composed of the improved superconductive material exhibit similar characteristics regarding current carrying capacity. FIGURE 3 shows that increase in thickness, that is, the number of layers, of the improved superconductive material has little effect of the critical current density regardless of the magnetic field.

Various features of the invention are set forth in the following claims.

What is claimed is:

1. An improved superconductive material comprising a plurality of layers of a first material which has superconductive electrical properties at a low absolute temperature, and a layer of a second material which has nonsuperconductive electrical properties at said low absolute temperature disposed intermediate each pair of layers of said first material to provide a composite material of alternating layer construction, said layer of said second material being substantially thinner than said layers of said first material, and wherein said layers of said first material are less than about a micron in thickness.

2. An improved superconductive material in accordance with claim 1 wherein said first material is a Type II superconductor.

3. An improved superconductive material in accordance with claim 1 wherein said nonsuperconductive material is normally a good conductor of electricity.

4. An improved superconductive material in accordance with claim 1 wherein said nonsuperconductive material is an electrical insulator.

5. An improved superconductive material in accordance with claim 1 wherein said first material is $Nb_3Sn$ superconductive material and said second material has nonsuperconductive properties at a temperature at which said $Nb_3Sn$ has superconductive properties.

6. An improved superconductive material in accordance with claim 5 wherein said second material is niobium.

7. An improved superconductive material in accordance with claim 6 wherein said plurality of layers of $Nb_3Sn$ superconductive material are each between about 75 A. and about 2000 A. thick, and said intermediate layers of niobium are each between about 15 A. and about 400 A. thick.

8. An improved superconductive material in accordance with claim 1 wherein a conductive substrate underlies said composite material and wherein a coating of a conductive substance overlies said composite material and forms an outer protective layer.

9. An improved superconductive material in accordance with claim 8 wherein said outer protective layer also includes a thin electrically insulating layer overlying said conductive substance.

10. An improved superconductive material in accordance with claim 1 wherein said layers of said first material are at least 50 A. in thickness.

11. An improved superconductive material in accordance with claim 6 wherein said layers of niobium each have a thickness of about 100 A.

12. An improved superconductive material in accordance with claim 1 wherein said layers of said second material each have a thickness of no more than about 20% of the thickness of said first layers.

References Cited

UNITED STATES PATENTS

| | | | |
|---|---|---|---|
| 2,973,571 | 3/1961 | Meyering | 29—194 |
| 3,181,936 | 5/1965 | Denny et al. | 29—194 |
| 3,218,693 | 11/1965 | Allen et al. | 29—599 |
| 3,262,187 | 7/1966 | Allen et al. | 29—599 |
| 3,293,008 | 12/1966 | Allen et al. | 29—183 |
| 3,293,009 | 12/1966 | Allen et al. | 29—193 |
| 3,293,076 | 12/1966 | Allen et al. | 117—213 |
| 3,296,684 | 1/1967 | Allen et al. | 29—599 |
| 3,309,179 | 3/1967 | Fairbanks | 29—194 |
| 3,310,862 | 3/1967 | Allen | 29—599 |

L. DEWAYNE RUTLEDGE, *Primary Examiner.*

E. L. WEISE, *Assistant Examiner.*

U.S. Cl. X.R.

29—599; 117—107, 217